United States Patent
Miller

(10) Patent No.: US 6,678,587 B2
(45) Date of Patent: Jan. 13, 2004

(54) SYSTEM FOR TANKER ENTERING RENDEZVOUS ORBIT

(75) Inventor: Ronald J. Miller, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 149 days.

(21) Appl. No.: 10/080,332

(22) Filed: Feb. 20, 2002

(65) Prior Publication Data

US 2002/0193915 A1 Dec. 19, 2002

Related U.S. Application Data

(60) Provisional application No. 60/298,205, filed on Jun. 13, 2001.

(51) Int. Cl.[7] .............................................. G01C 21/00
(52) U.S. Cl. ........................................... 701/3; 701/202
(58) Field of Search .......................... 701/3, 12, 1, 202, 701/208, 209, 213, 210, 218; 33/15 D; 340/286.14, 955, 979, 977, 978; 342/452, 455

(56) References Cited

U.S. PATENT DOCUMENTS

| | | | |
|---|---|---|---|
| 5,103,712 A | * | 4/1992 | Minovitch .................... 89/1.11 |
| 6,167,627 B1 | * | 1/2001 | Wilder et al. ................ 33/15 D |
| 6,246,957 B1 | * | 6/2001 | Barrer et al. ................ 701/202 |

FOREIGN PATENT DOCUMENTS

WO     WO 00 65373 A     11/2000

OTHER PUBLICATIONS

Final Draft DO–236A Minimum Aviation System Performance Standards: Required Navigation performance for Area Navigation; Oct. 1999; pp. 37–42 and Appendix E, pp. E1–E6.

International Search Report, Dec. 12, 2002; PCT/US 02/18588.

* cited by examiner

Primary Examiner—Richard M. Camby
(74) Attorney, Agent, or Firm—Kurt A. Luther; Dennis F. Armijo

(57) ABSTRACT

A navigation and guidance computer system using navigation sensors to determine aircraft position, and automatically control the aircraft to fly from an initial position to intercept and follow a crew-selected rendezvous orbit in accordance with Air Traffic Control and military specified rules. It creates maneuvers that result in smooth, efficient motion of the aircraft from an initial position to the execution of a rendezvous orbit. It controls the aircraft by applying commands to the aircraft's autopilot. The system creates the smooth and coordinated maneuvers by considering and anticipating all constraints on the aircraft flight path by creating a single maneuver that is a re-entry maneuver, an over fly maneuver, and a turning maneuver all as a single turn that is contained entirely within the allowable airspace. All maneuvers are created and executed recognizing the turning capability of the aircraft considering allowable bank angles, current wind conditions and true airspeed.

14 Claims, 5 Drawing Sheets

SYSTEM FOR TANKER ENTERING RENDEZVOUS ORBIT

CROSS-REFERENCE TO RELATED APPLICATIONS

This application is based on U.S. Provisional Application Ser. No. 60/298,205 entitled "Means For Tanker Entering Rendezvous Orbit" filed on Jun. 13, 2001, the teachings of which are incorporated herein by reference.

BACKGROUND OF THE INVENTION

1. Field of the Invention (Technical Field)

This invention is related to aircraft flight guidance and more particularly a novel method and apparatus for the entry into a refueling rendezvous orbit with minimum maneuvering, and without violating airspace boundaries around the orbit.

2. Background Art

A problem occurs when a tanker is entering a rendezvous orbit in preparation for meeting with another aircraft, a receiver, in order to conduct airborne refueling operations. Normally the orbit pattern is anchored to a point in the airspace that is designated specifically for the air refueling mission. As such, the military aircraft that are to conduct the mission are expected to remain in the designated area, and all other aircraft are to be excluded. The point to which the rendezvous orbit is anchored (called the air refueling control point) is normally at the boundary of the designated area. This can make it very difficult for aircrews to enter the orbit without violating the boundary, and going outside the designated refueling area. This is a considerable problem when the aircraft is returning to the rendezvous orbit from inside the designated refueling area.

Presently, the prior art procedure preferred by air traffic control (ATC) for in-flight tanker refueling, is for the tanker to enter the rendezvous orbit by flying to the control point, over-flying it, and immediately turning onto the rendezvous leg (outbound leg), as shown in FIG. 1a. Performing this combined maneuver can result in two potentially difficult turns in rapid succession. FIG. 1a shows the technique typically used by tanker crews when flying the maneuver manually. As shown in FIG. 1a, any overshoot when performing this maneuver results in violating the airspace boundary.

The only prior art system that performs automated returns to the rendezvous orbit is the Collins FMS-800 system installed on some military aircraft. The technique used by this system is shown in FIG. 1b. This system computes aircraft position from a global positioning system (GPS) and inertial navigation system (INS) measurements, but its entry strategy and methodology is entirely different from the present invention. This system has no explicit protection for violating the airspace boundary, and it does not return to the orbit at the control point, as desired by ATC. Instead, the Collins system causes the aircraft to intersect the midpoint of the leg (inbound or outbound) whose bearing is closest to the bearing from the aircraft to the orbit. This allows computational simplicity, and avoids the necessity to perform two turns in rapid succession. However, it results in significantly compromised performance by requiring unnecessary time in the orbit.

Another prior art method is to approach the inbound leg on a path nearly parallel to the adjacent airspace boundary, overfly the control point, and continue in the orbit. The navigation aid used to assist the pilot in this maneuver is the inertial navigation system with its point-to-point or alignment way point navigation capability (A, B, C and D) as shown in FIG. 1c. The crew constructs a path along the boundary that passes through the control point. The pilot then approaches this path from inside the airspace boundary, monitoring cross-track error with respect to this path. This technique also requires unnecessary maneuvering.

The major disadvantage of the aforementioned prior art techniques are that they all involve extra maneuvering that wastes time and fuel. If a rendezvous is to take place, the sooner that a tanker can get into the outbound leg of rendezvous orbit, the less time is wasted in making the hook-up with the receiver. Note that the final rendezvous maneuver is made from the outbound leg, extended until the proper range is reached to the receiver for a successful rendezvous. These prior art approaches have also been limited by computational capabilities. They have attempted to achieve an entry into the rendezvous orbit that could be implemented within the throughput capability of the available processors. Prior art automated systems utilize a technique that captures the midpoint of a leg, thereby avoiding the necessity to enter another turn immediately upon re-entering the orbit. They have been limited by an incomplete understanding of the mission needs of the air crews that were performing the mission. Prior art approaches have focused on getting into the orbit on a straight line segment, thereby separating the orbit turning maneuver from the orbit re-entry maneuver. Furthermore, they have not made overflying the control point a priority, contrary to the desires of ATC.

SUMMARY OF THE INVENTION (DISCLOSURE OF THE INVENTION)

The present invention satisfies all constraints of a refueling orbit maneuver without requiring the aircraft to execute a series of difficult maneuvers in close succession in order to enter the orbit, over-fly the control point, and immediately enter the outbound turn. It accomplishes this by anticipating all the required maneuvers and constraints. Thus, as it enters the orbit, it overflies the control point (if physically possible), with a bank angle that results in entering the outbound turn, all in one smooth continuous maneuver, and without violating the airspace boundary.

The preferred method for maneuvering an aircraft for entering into a holding pattern, the aircraft position being known and the location and orientation of the holding pattern being known comprises the steps of dividing an airspace around the holding pattern into at least three zones, determining a relative bearing between a line from the aircraft to a control point of the holding pattern and an inbound leg line through the control point of the holding pattern, selecting an entry zone from the at least three zones based on the determined relative bearing, providing a predetermined entry maneuver for the selected entry zone and executing the predetermined entry maneuver. The at least three zones preferably comprise a first zone comprising the relative bearing of an angle between −180 degrees to <0 degrees, a second zone comprising the relative bearing of an angle between >+90 degrees to <+180 degrees and a third zone comprising the relative bearing of an angle between 0 to +90 degrees. The second zone preferably further comprises a zone 2b comprising a portion of second zone that lies between the inbound leg and an outbound leg extended and a zone 2a comprising a remaining portion of the second zone not within zone 2b. The preferred step of providing a predetermined entry maneuver for zone 2a comprises initially flying toward the control point and turning to capture the outbound leg of the holding pattern. The preferred step of turning to capture the outbound leg of the holding pattern comprises initiating the turn after intersecting the outbound leg. The preferred step of providing a predetermined entry maneuver for zone 2b comprises initially flying toward the control point and initiating a turn to capture the outbound leg of the holding pattern at a distance from the control point equal to twice an aircraft's worst case turning radius. The preferred step of providing a predetermined entry maneuver for zone 1 comprises flying over the control point and capturing the outbound leg of the holding pattern. The preferred step of flying over the control point comprises flying directly to and over the control point. The preferred step of providing a predetermined entry maneuver for zone 3 comprises flying to intersect tangentially semicircle with a radius equal to an aircraft's worst-case turn radius which lies within zone 3 and which passes through the holding pattern control point tangential to the holding pattern inbound leg. The preferred step of providing a predetermined entry maneuver for the selected entry zone comprises automatic commands to an autopilot. An alternative step of providing a predetermined entry maneuver for the selected entry zone comprises a manual command displayed to a crew. An alternative step of turning to capture the outbound leg of the holding pattern comprises initiating the turn before intersecting the outbound leg. The preferred holding pattern comprises a refueling rendezvous orbit.

The preferred method for maneuvering an aircraft for entering into a holding pattern, the aircraft position being known and the location and orientation of the holding pattern being known comprises the steps of determining a relative bearing between a line from the aircraft to a control point of the holding pattern and an inbound leg line through the control point of the holding pattern, dividing an airspace around the holding pattern into at least three entry zones, the three entry zones comprising a first zone comprising the relative bearing of an angle between −180 degrees to <0 degrees, a second zone comprising the relative bearing of an angle between >+90 degrees to <+180 degrees, wherein second zone further comprises, zone 2b comprising a portion of second zone that lies between the inbound leg and an outbound leg extended and zone 2a comprising a remaining portion of the second zone not within zone 2b and a third zone comprising the relative bearing of an angle between 0 to +90 degrees, providing a preselected entry maneuver for each entry zone, wherein the entry maneuver for the first zone comprises flying over the control point and capturing the outbound leg of the holding pattern, the entry maneuver for 2a comprises initially flying toward the control point and turning to capture the outbound leg of the holding pattern, the entry maneuver for zone 2b comprises initially flying toward the control point and initiating a turn to capture the outbound leg of the holding pattern at a distance from the control point equal to twice an aircraft's worst case turning radius and the entry maneuver for zone 3 comprises flying to intersect tangentially semicircle with a radius equal to an aircraft's worst-case turn radius which lies within zone 3 and which passes through the holding pattern control point tangential to the holding pattern inbound leg, electing an entry zone base on the determined relative bearing and executing the preselected maneuver for the selected entry zone.

A primary object of the present invention is to provide a path to the refueling orbit without unnecessary or undesirable maneuvers.

Another object of the present invention is to provide selected entry strategies based on three zones for orbit entry.

A primary advantage of the present invention is that it uses "standard" flight management leg types in a unique combination to produce the desired maneuver with minimum "wasted" motion of the aircraft.

Another advantage of the present invention is that it follows air traffic control (ATC) directions more closely than present systems.

Yet another advantage of the present invention is that it sets the tanker up for a rendezvous with a receiver in minimum time.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

This disclosure will discuss a novel rendezvous orbit entry strategy for in-flight refueling. The invention will not be described algorithmically. That is, the algorithms that accomplish the location of turn centers, tangent points, and other reference points used in the implementation may utilize planar geometry equations as a good approximation in the area of the rendezvous orbit, more accurate spherical geometry equations, or other higher-order equations that provide extreme accuracy considering the curvature and flattening of the earth as an oblate spheroid. Such equations are familiar to those skilled in the navigation art. As used herein, such equations have one of two objectives: 1) given two points on the earth's surface, determine the distance between them, and the bearing from one point to the other; and 2) given the location of one point on the earth surface, determine the location of another point at a specified distance and bearing from the original point. Such equations are implemented in all navigation computers, and the complexity of the implementation is determined by the accuracy required of the system in question. Those skilled in the art will readily recognize in reviewing the figures where and how such equations must be applied to correctly locate such turn centers, tangent points, and tracks. It must be emphasized that the present invention would function equally well if computations were in another coordinate system, such as earth centered, earth fixed (ECEF) rather than latitude/longitude.

Figure 1A:
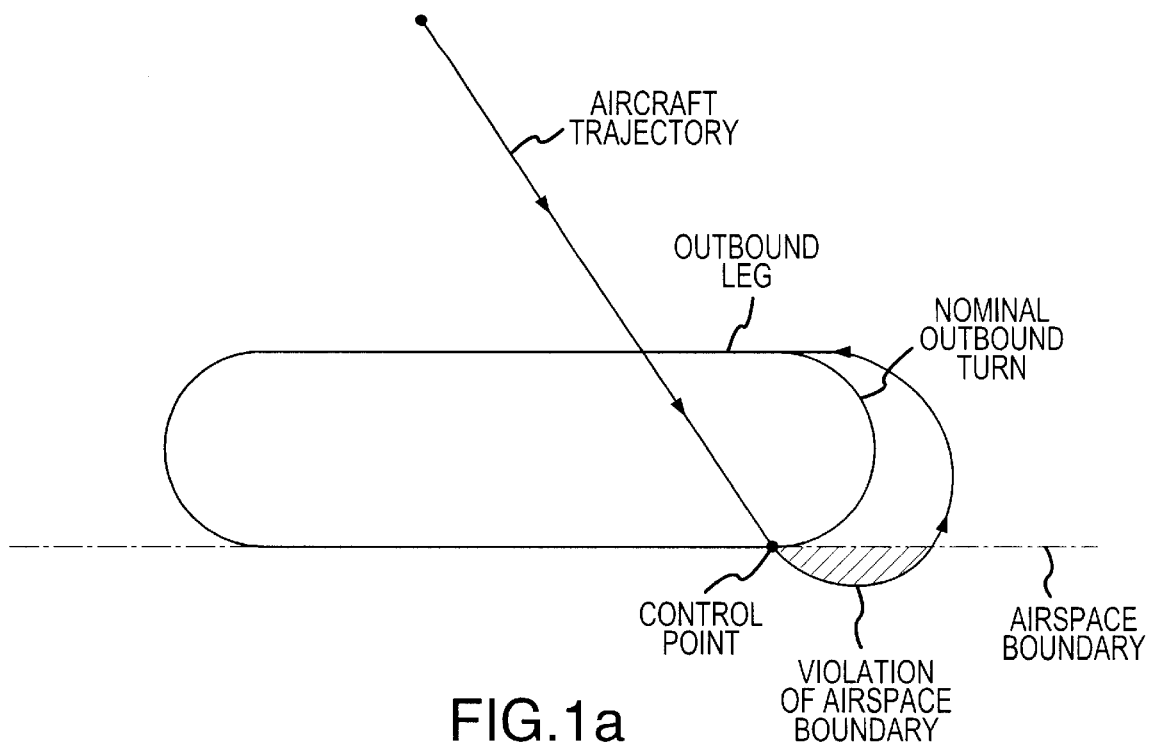
FIGS. 1a, 1b and 1c are diagrams showing prior art orbit entry strategies.
Figure 1B:
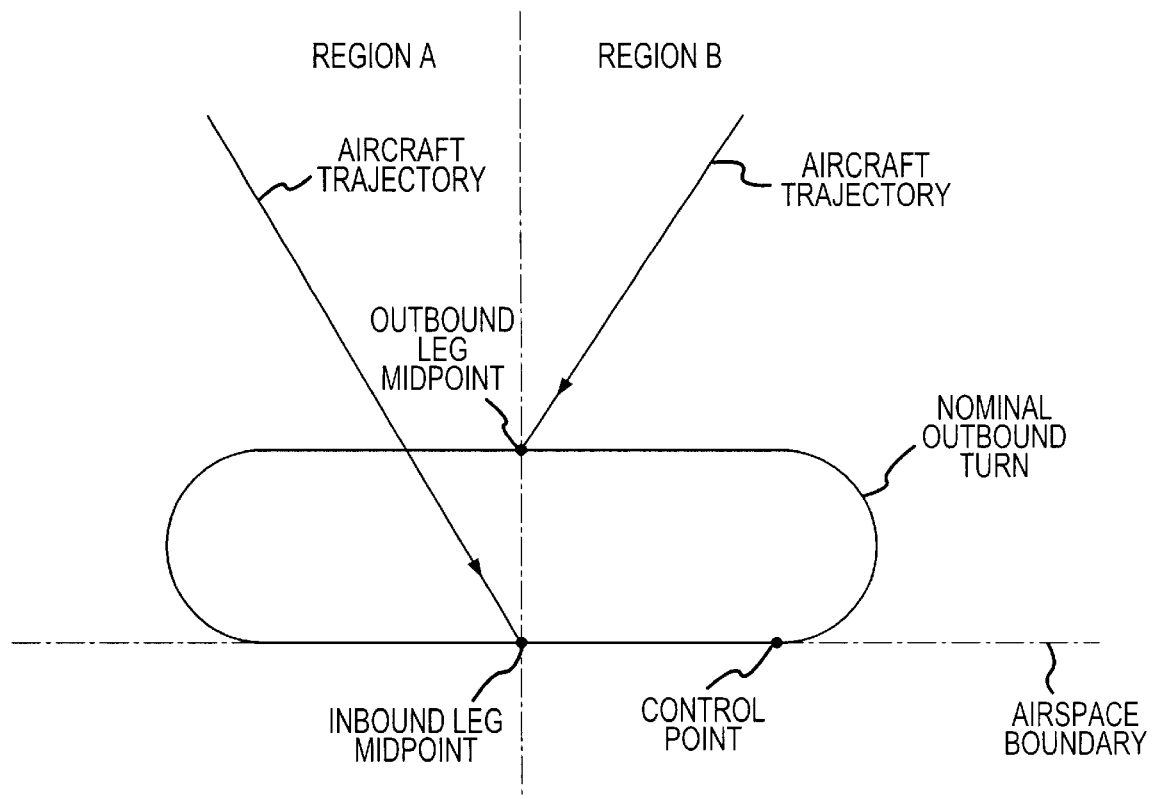
Figure 1C:
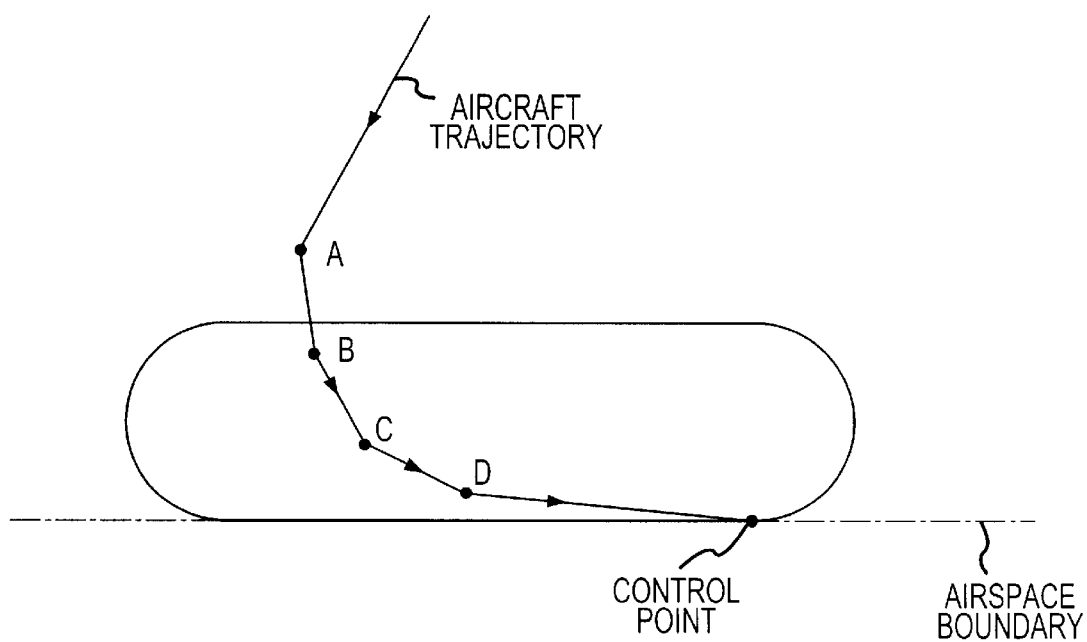
Figure 2:
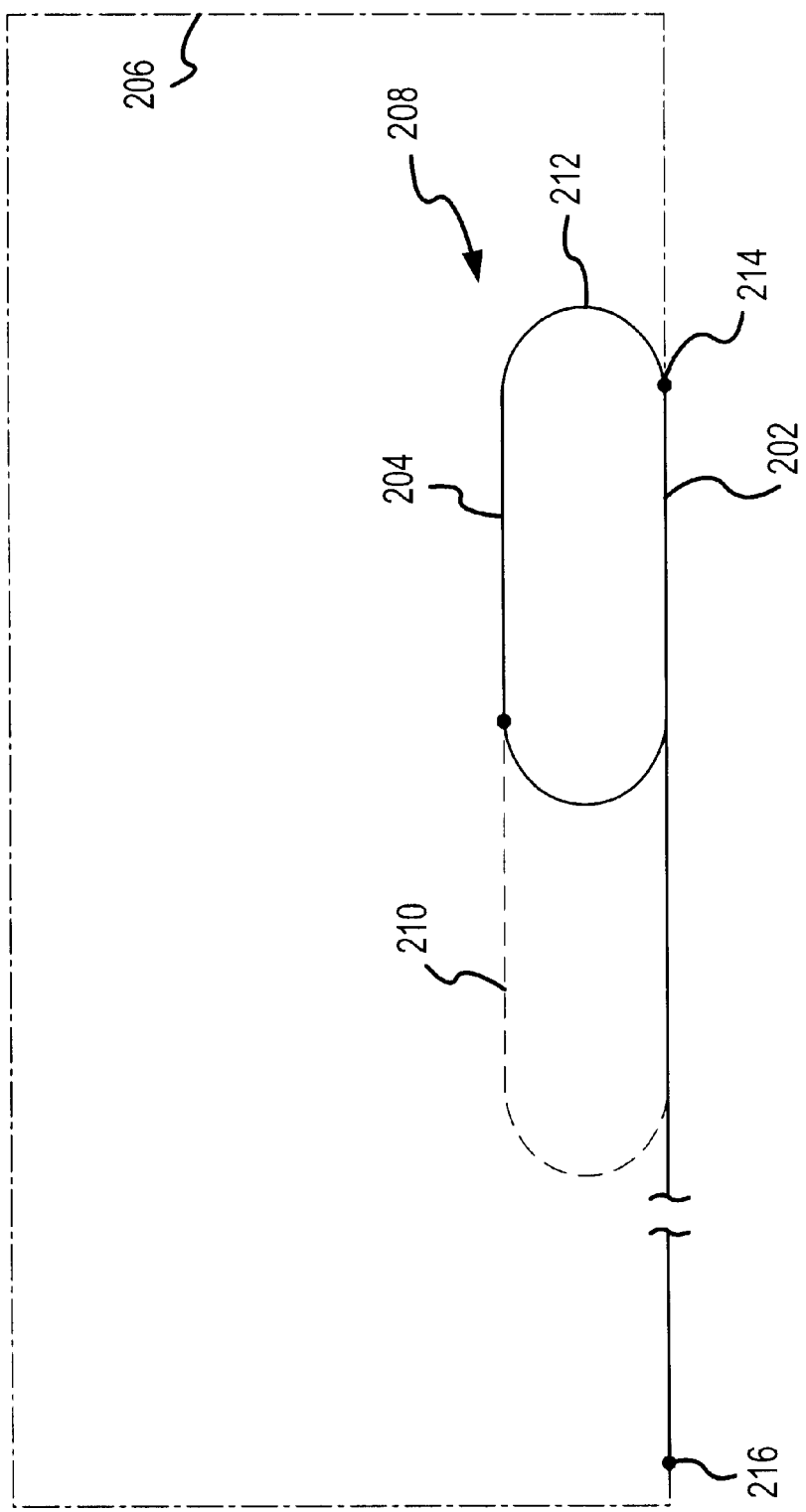
FIG. 2 is a diagram showing a typical point parallel rendezvous racetrack pattern for tanker aircraft.

A typical orbiting geometry is shown in FIG. 2. The typical geometry contains airspace boundaries 206 and the orbit or "race track" pattern 208, consisting of an outbound leg 204, an outbound turn 212, a control point 214, an inbound leg 202, and a rendezvous leg 210, which is the outbound leg extended. The geometry of the orbit pattern 208 is determined by the refueling mission. The length of the inbound 202 and outbound legs 204 is normally fourteen miles, while the width of the pattern is determined by the speeds of the tanker and receiver, and the current winds. This width is selected to enable a final rendezvous maneuver to be performed so that the actual refueling can take place immediately following the turn from the extended outbound leg to the extended inbound leg. This orbit geometry is documented in the military refueling manuals. Establishing this geometry is not part of the current invention.

The invention determines a maneuver from the aircraft current position to the orbit 208 based on the bearing from the aircraft to the control point 214 to which the refueling orbit is anchored and the orientation of the inbound leg 202 of the rendezvous orbit. The inbound leg 202 normally lies along a line from the air refueling initial point (ARIP) 216 to the air refueling control point (ARCP) 214.

When the crew desires to enter the rendezvous 208, they select the INTERCEPT mode. The system calculates the intercept to the air refueling orbit (see the following ORBIT section for orbit details) based the following:

a. the bearing from the aircraft to the ARCP 214 (BACP),
b. the bearing from the ARIP 216 to the ARCP 214 (BIPCP),
c. the relative orientation of the BACP to the BIPCP. Specifically $$\text{ALPHA}=BACP-BIPCP. \quad (1)$$

Figure 3:
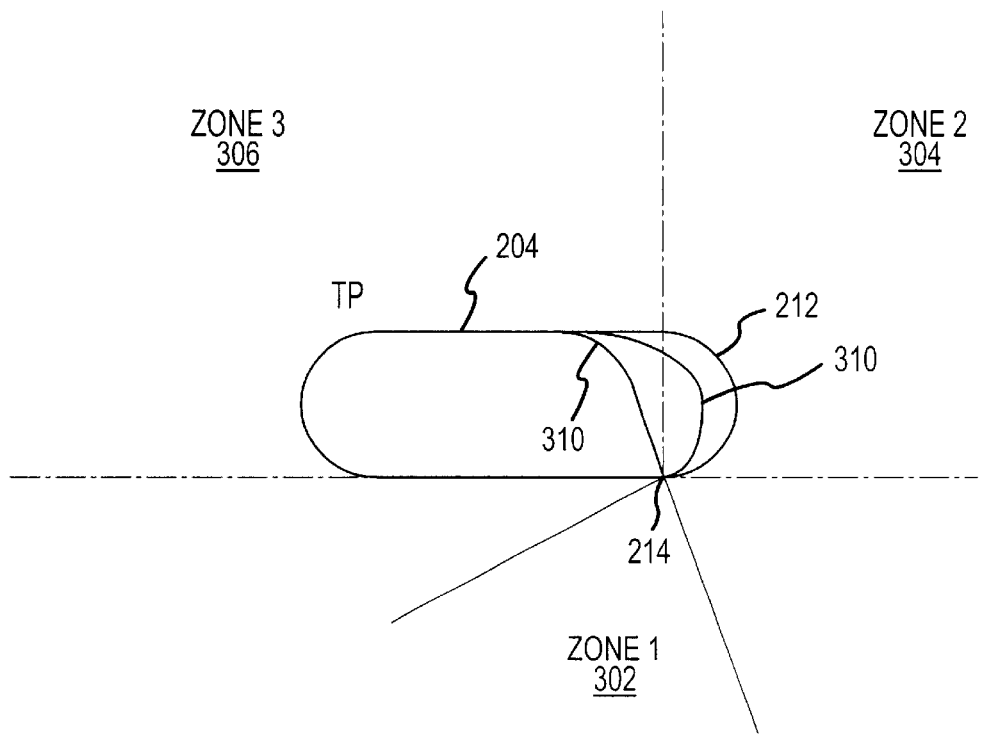
FIG. 3 is a diagram showing the preferred zone 1 rendezvous orbit entry strategy.

FIG. 3 shows the airspace around the ARCP divided into three zones 302, 304, 306. The orbit intercept strategy is different for each of these three zones. The zones are defined as follows:

$$\text{zone 1 302: } -180 < \text{ALPHA} < 0 \quad (2)$$

$$\text{zone 2 304: } 90 < \text{ALPHA} < 180 \quad (3)$$

$$\text{zone 3 306: } 0 = < \text{ALPHA} = < 90 \quad (4)$$

The following requirements will be defined in terms of these zones.

If the aircraft is in zone 1 302 when the flight crew selects INTERCEPT, the FMS provides modified DIRECT TO (DF) guidance to fly to the ARCP 214, overfly it, and capture the outbound leg 204. Having overflown the ARCP 214, the aircraft executes a transition curve 310 to capture the outbound leg 204 that somewhat parallels the outbound turn 212 defined as part to refueling orbit. Two such typical flight paths with their respective transition curves 310, are shown in FIG. 3. It should be noted that normally, a DF leg consists of an initial transition curve to allow the aircraft to turn from its initial heading to a heading directly toward the ultimate destination of the leg (in this case, the ARCP). A track from the end of the transition curve to the destination fix is then constructed and flown. However, the modified DF as used in this INTERCEPT section means that a leg is constructed from the initial aircraft position to the intercept point (the ARCP for zone 1 and 2), and no initial transition curve is constructed. It should be noted that a different embodiment of the current invention could utilize a "standard" DF leg with its transition curve (not shown). This represents only a minor deviation from the preferred embodiment described herein.

Figure 4:
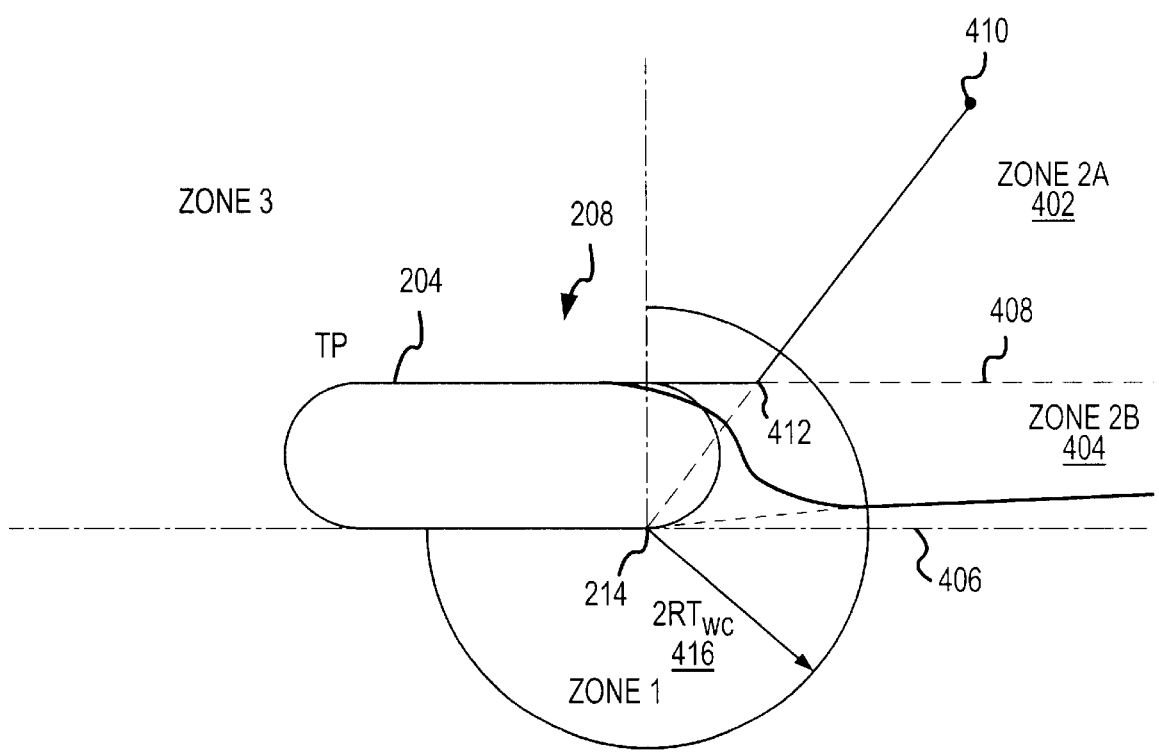
FIG. 4 is a diagram showing the preferred zone 2 rendezvous orbit entry strategy.

The preferred zone 2 intercept is shown in FIG. 4. Zone 2 is further divided into sub-zones termed zone 2A 402 and 2B 404. Zone 2A 402 is the portion of zone 2 that is NOT contained between the extended inbound 406 and extended outbound legs 408 of the orbit 208.

If the aircraft is in zone 2A 402 when the flight crew selects INTERCEPT, the FMS provides guidance along a track defined from aircraft initial position 410 to the ARCP 214. However, the aircraft is initially guided to follow this course, only until it intercepts 412 the extended outbound leg 408. At the intersection 412 with the extended outbound leg 408, the aircraft is commanded to capture the outbound course 204 rather than complete the guidance to the ARCP 214. This satisfies the ATC direction to return to the ARCP 214, but avoids the impossible maneuver of overflying the ARCP 214 and immediately entering the outbound turn without violating the airspace restrictions.

Zone 2B 404 is the portion of zone 2 that is contained between the extended inbound 406 and extended outbound 408 legs of the orbit 208.

If the aircraft is in zone 2B 404 when the flight crew selects INTERCEPT, the system initially provides guidance along a track from the aircraft position 410 to the ARCP 214. When the distance to the ARCP 214 is less than or equal to two times Rt(wc) 416, as defined below, the system causes the aircraft to be guided to leave the track to the ARCP 214, and capture and track the outbound leg. Note that this satisfies ATC direction, while eliminating an impossible maneuver.

Note that Rt(wc) is the WORST CASE TURN RADIUS where $$Rt(wc)=[Vg(wc)^2]/[g^*\tan(\text{BANK ANGLE LIMIT})] \quad (5)$$

$$Vg(wc)=\text{TANKER } TAS+\text{WIND MAGNITUDE} \quad (6)$$

(that is Vg(wc)=Worst case maximum ground speed for the current TAS and wind),
g=acceleration due to gravity and BANK ANGLE LIMIT=The maximum bank angle commandable by the system, as selected by the crew (7)

Figure 5:
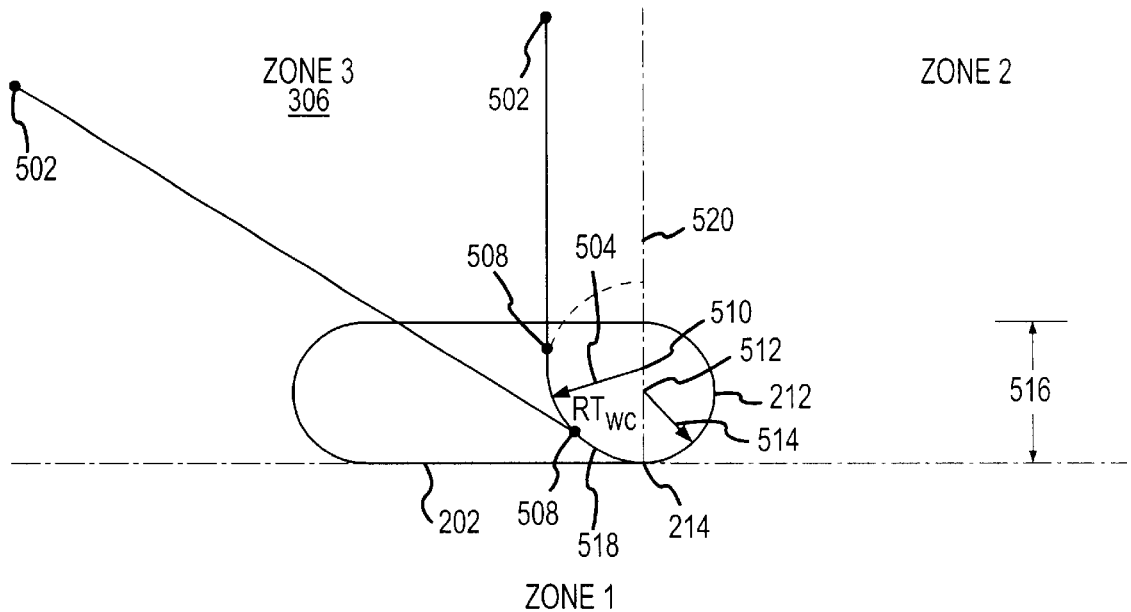
FIG. 5 is a diagram showing the preferred zone 3 rendezvous orbit entry strategy.

As shown in FIG. 5, if the aircraft is in zone 3 306 when the flight crew selects INTERCEPT, the system provides guidance along a track from the aircraft position 502 to the tangential intercept 508 of a circle of radius Rt(wc) 504 that is also tangent to the inbound leg 202 at the ARCP 214. As shown in FIG. 5, the path that is flown is a track from the aircraft position 502 to the aforementioned intercept point 508, along the curve 518 of radius Rt(wc) 504 until the aircraft has passed over the ARCP 214. FIG. 5 shows two such typical flight paths with their respective transition curves 518, and transition points for two different initial positions 506. While the initial track flown by the aircraft is not directly to the ARCP 214, the aircraft still satisfies ATC requirement to return to the ARCP 214. Furthermore, by following the transition curve 518 of radius Rt(wc) 504 just described, the aircraft overflies the ARCP 214 with a bank angle that allows smooth continuing flight into the outbound turn 212.

Referring to FIG. 5, it will be noted that the center of the transition curve 510 that results in overflying the ARCP 214 will not necessarily coincide with the center 512 of the outbound curve 212 (unless there is no wind). The radius 514 of the outbound turn 212 is determined by the pattern width 516, whereas the radius 504 of the transition curve 518 is determined by equations 2–8, above. To have the aircraft overfly the ARCP 214 at tangent point 508 to inbound leg 202, without overshoot, the center of the transition curve must be placed at a point 510 that is a distance Rt(wc) 504 from the ARCP 214, along a line 520 from the ARCP 214 perpendicular to the inbound leg 202.

Figure 6:
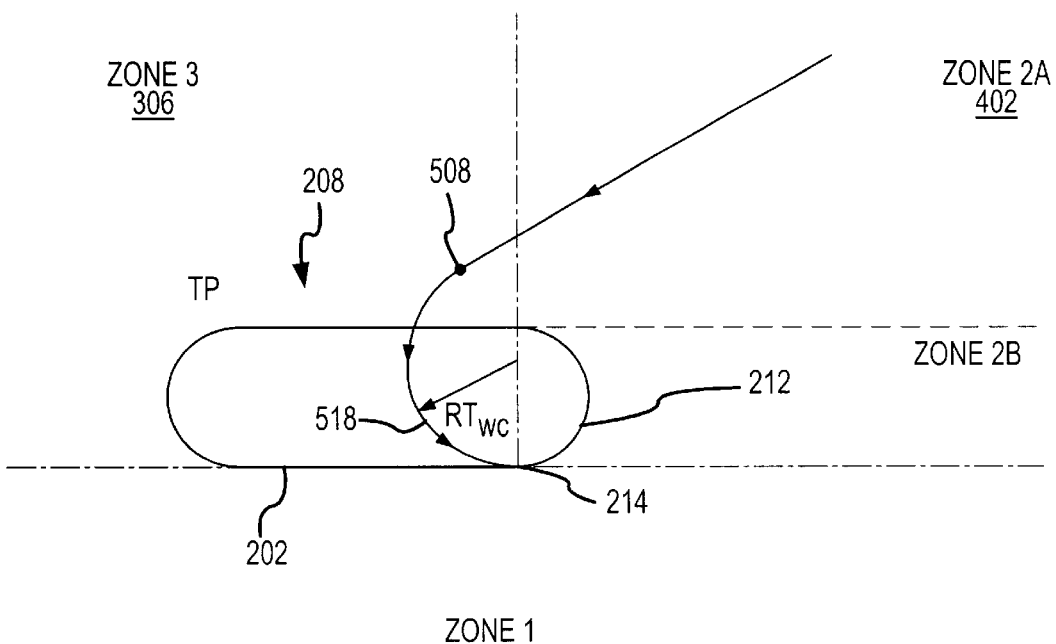
FIG. 6 is a diagram showing a n alternative zone 2 rendezvous orbit entry strategy.

An additional variation that would nearly meet all constraints would be to extend the techniques of Zone 3 306 into Zone 2A 402, as shown in FIG. 6. This technique would allow the aircraft to enter the orbit 208, by flying to the tangent point 508 of transition curve 518 following the transition curve 518 to its transition point with the inbound leg 202, overflying the ARCP 214, and smoothly entering the outbound turn 212. However, the initial track followed by the aircraft would be significantly different from a track from the aircraft initial position to the ARCP 214. Furthermore, the aircraft would fly a significantly longer path to arrive on course on the outbound leg ready for the final rendezvous maneuver.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for maneuvering an aircraft for entering into a holding pattern, the aircraft position being known and the location and orientation of the holding pattern being known, the method comprising the steps of:
    dividing an airspace around the holding pattern into at least three zones;
    determining a relative bearing between a line from the aircraft to a control point of the holding pattern and an inbound leg line through the control point of the holding pattern;
    selecting an entry zone from the at least three zones based on the determined relative bearing;
    providing a predetermined entry maneuver for the selected entry zone; and
    executing the predetermined entry maneuver.

2. The method of claim 1 wherein the at least three zones comprise:
    a first zone comprising the relative bearing of an angle between −180 degrees to <0 degrees;
    a second zone comprising the relative bearing of an angle between >+90 degrees to <+180 degrees; and
    a third zone comprising the relative bearing of an angle between 0 to +90 degrees.

3. The method of claim 2 wherein second zone further comprises:
    zone 2b comprising a portion of second zone that lies between the inbound leg and an outbound leg extended; and
    zone 2a comprising a remaining portion of the second zone not within zone 2b.

4. The method of claim 3 wherein the step of providing a predetermined entry maneuver for zone 2a comprises:
    initially flying toward the control point; and
    turning to capture the outbound leg of the holding pattern.

5. The method of claim 4 wherein the step of turning to capture the outbound leg of the holding pattern comprises initiating the turn after intersecting the outbound leg.

6. The method of claim 3 wherein the step of providing a predetermined entry maneuver for zone 2b comprises:
    initially flying toward the control point; and
    initiating a turn to capture the outbound leg of the holding pattern at a distance from the control point equal to twice an aircraft's worst case turning radius.

7. The method of claim 2 wherein the step of providing a predetermined entry maneuver for zone 1 comprises:
    flying over the control point; and
    capturing the outbound leg of the holding pattern.

8. The method of claim 7 wherein the step of flying over the control point comprises flying directly to and over the control point.

9. The method of claim 2 wherein the step of providing a predetermined entry maneuver for zone 3 comprises flying to intersect tangentially semicircle with a radius equal to an aircraft's worst-case turn radius which lies within zone 3 and which passes through the holding pattern control point tangential to the holding pattern inbound leg.

10. The method of claim 1 wherein the step of providing a predetermined entry maneuver for the selected entry zone comprises automatic commands to an autopilot.

11. The method of claim 1 wherein the step of providing a predetermined entry maneuver for the selected entry zone comprises a manual command displayed to a crew.

12. The method of claim 4 wherein the step of turning to capture the outbound leg of the holding pattern comprises initiating the turn before intersecting the outbound leg.

13. The method of claim 1 wherein the holding pattern comprises a refueling rendezvous orbit.

14. A method for maneuvering an aircraft for entering into a holding pattern, the aircraft position being known and the location and orientation of the holding pattern being known, the method comprising the steps of:
    determining a relative bearing between a line from the aircraft to a control point of the holding pattern and an inbound leg line through the control point of the holding pattern;
    dividing an airspace around the holding pattern into at least three entry zones, the three entry zones comprising:
        a first zone comprising the relative bearing of an angle between −180 degrees to <0 degrees;
        a second zone comprising the relative bearing of an angle between >+90 degrees to <+180 degrees, wherein second zone further comprises:
            zone 2b comprising a portion of second zone that lies between the inbound leg and an outbound leg extended; and
            zone 2a comprising a remaining portion of the second zone not within zone 2b; and
        a third zone comprising the relative bearing of an angle between 0 to +90 degrees;
    providing a preselected entry maneuver for each entry zone,
    wherein the entry maneuver for the first zone comprises flying over the control point and capturing the outbound leg of the holding pattern;

the entry maneuver for 2a comprises initially flying toward the control point and turning to capture the outbound leg of the holding pattern;

the entry maneuver for zone 2b comprises initially flying toward the control point and initiating a turn to capture the outbound leg of the holding pattern at a distance from the control point equal to twice an aircraft's worst case turning radius; and the entry maneuver for zone 3 comprises flying to intersect tangentially semicircle with a radius equal to an aircraft's worst-case turn radius which lies within zone 3 and which passes through the holding pattern control point tangential to the holding pattern inbound leg;

selecting an entry zone base on the determined relative bearing; and executing the preselected maneuver for the selected entry zone.

\* \* \* \* \*